US006836209B2

(12) United States Patent
Ploucha

(10) Patent No.: US 6,836,209 B2
(45) Date of Patent: Dec. 28, 2004

(54) LIFTGATE ANTI-PINCH DETECTOR UTILIZING BACK-UP SENSORS

(75) Inventor: Joseph E. Ploucha, Sterling Heights, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 54 days.

(21) Appl. No.: 10/449,444

(22) Filed: May 30, 2003

(65) Prior Publication Data

US 2004/0040771 A1 Mar. 4, 2004

Related U.S. Application Data

(60) Provisional application No. 60/408,016, filed on Sep. 4, 2002.

(51) Int. Cl.[7] .................................................. B60Q 1/00

(52) U.S. Cl. .................... 340/435; 340/943; 340/425.5; 340/428; 340/426.26; 340/426.29; 49/26; 49/28; 318/280

(58) Field of Search ................................ 340/435, 943, 340/425.5, 428, 426.24, 426.26, 426.29; 367/909; 49/26, 28; 318/280

(56) References Cited

U.S. PATENT DOCUMENTS

| | | | | | |
|---|---|---|---|---|---|
| 5,563,483 | A | * | 10/1996 | Kowall et al. | 318/283 |
| 5,982,126 | A | * | 11/1999 | Hellinga et al. | 318/468 |
| 6,542,071 | B1 | * | 4/2003 | Ohtsubo et al. | 340/426.28 |
| 6,719,356 | B2 | * | 4/2004 | Cleland et al. | 296/146.8 |

* cited by examiner

*Primary Examiner*—Daryl C Pope

(57) ABSTRACT

An improved system for detecting the presence of an object in the path of a liftgate relies upon the sensor/transmitters that are used for collision avoidance systems to detect the presence of an object rearwardly of a vehicle moving in a reverse direction. Known sensors are provided to look for the presence of an object when the vehicle is being moved in a reverse direction. The sensors are now also actuated when the liftgate is being moved to its closed position. Should an object be detected, further movement of the liftgate is stopped. The present invention thus detects the presence of an object in the path of a liftgate prior to any contact. Further, the invention combines two prior control modules into a single control module.

6 Claims, 2 Drawing Sheets

LIFTGATE ANTI-PINCH DETECTOR UTILIZING BACK-UP SENSORS

The present invention claims priority to U.S. Provisional Patent Application Ser. No. 60/408,016 filed on Sep. 4, 2002.

BACKGROUND OF THE INVENTION

This invention utilizes existing back-up collision avoidance sensors to provide an anti-pinch function for a liftgate or other closure at the rear of a vehicle.

Modern vehicles are often provided with collision avoidance systems at the rear of the vehicle that can sense a foreign object in the path of the vehicle as the vehicle moves rearwardly. As an example, ultrasonic sensors are positioned along the rear bumper of a vehicle, and send out a signal rearwardly of the vehicle when the vehicle is moving in reverse. These sensors can detect an object behind the vehicle, and communicate with a display in the cab of the vehicle to provide a warning of the existence of the object.

Also, many vehicles are provided with a liftgate, tailgate, or other closure for the rear of the cab of the vehicle. All of these rear closures will be referred to generically as a liftgate for purposes of this application.

Such rear closures are often power closed by a motor driving an element to close the closure. The known liftgate systems will often include an anti-pinch algorithm, which monitors an electrical characteristic of the motor such as current or voltage. If this electrical characteristic provides an indication that an object is in the path of the closing liftgate, then further movement of the liftgate may be stopped or reversed. This prevents pinching when a person, such as a child, is in the path of a moving liftgate. While known anti-pinch algorithms are quite beneficial, they still do require actual contact between the object in the path of the liftgate and the liftgate. It would be desirable to provide an anti-pinch arrangement that does not require actual contact.

SUMMARY OF THE INVENTION

In a disclosed embodiment of this invention, the known back-up detectors are utilized when a liftgate is being moved to the closed position. If the back-up detectors detect the presence of an object in the path of the liftgate, then the motor for the liftgate is stopped, preventing the liftgate from further closing. Thus, the object will be detected prior to the liftgate contacting the object and the liftgate will not close to contact the object.

The present invention thus provides benefits in not requiring actual contact between the object and the liftgate. Further, the integration of a single sensor to provide both functions reduces the number of components that must be incorporated into the vehicle.

While the present invention is most preferably utilized in a power liftgate system to stop a motor, it is also within the scope of this invention that a manually closed liftgate could have some blocking feature to block closing movement of the liftgate should an object be detected in the path of the liftgate.

These and other features of this invention can be best understood from the following specification and drawings, the following of which is a brief description.

DETAILED DESCRIPTION OF THE PREFERRED EMBODIMENT

Figure 1:
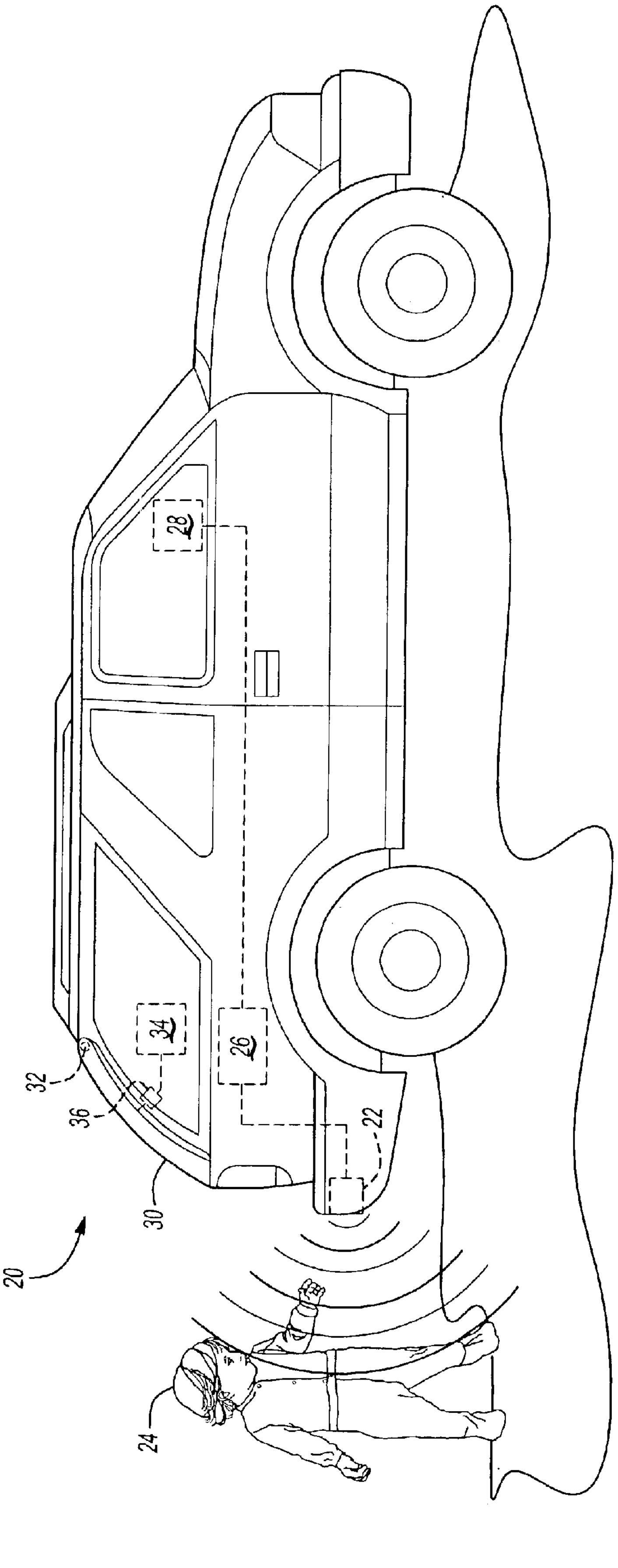
Fig-1 PRIOR ART
FIG. 1 schematically shows a prior art system.

FIG. 1 shows a vehicle 20 incorporating back-up sensors 22. As known, the back-up sensors operate when the vehicle is in reverse to send ultrasonic signals rearwardly, and to sense for reflected waves. The reflected waves provide an indication of the presence of an object, such as child 24 rearwardly of the vehicle. Typically a signal is sent to a control 26 when an object is detected and some warning is provided to a display 28 in the cab of the vehicle. The warning may be visual, audio, etc. Thus, the operator of the vehicle has an indication that an object is in the path of the vehicle and can take appropriate measures.

The prior art also incorporated a liftgate 30 that is pivotally attached at 32 near the top of the vehicle. As is known, a motor 36 drives some mechanical drive transmission to close the liftgate 30. Liftgate screws, or other known mechanical attachments can provide the transmission. In modern vehicles, the motor 36 is often actuated to drive the liftgate to a closed position when the operator is not in the vicinity of the liftgate 30. Remote transmitters are known which provide a close signal to a control 34 for the motor 36. Thus, it is possible that a child 24, or some other object may be in the path of the closing liftgate 30 and the operator would not be aware of the presence. The prior art has included a control which monitors electrical characteristics of the motor 36 to determine the presence of the object by looking for a spike or change in the current, voltage, etc. While this method does provide a good indication of the presence of an object, it requires contact before there is the actual change in the electrical characteristic. Moreover, separate electric controls are required for the liftgate closure motor and for the back-up sensor.

Figure 2:
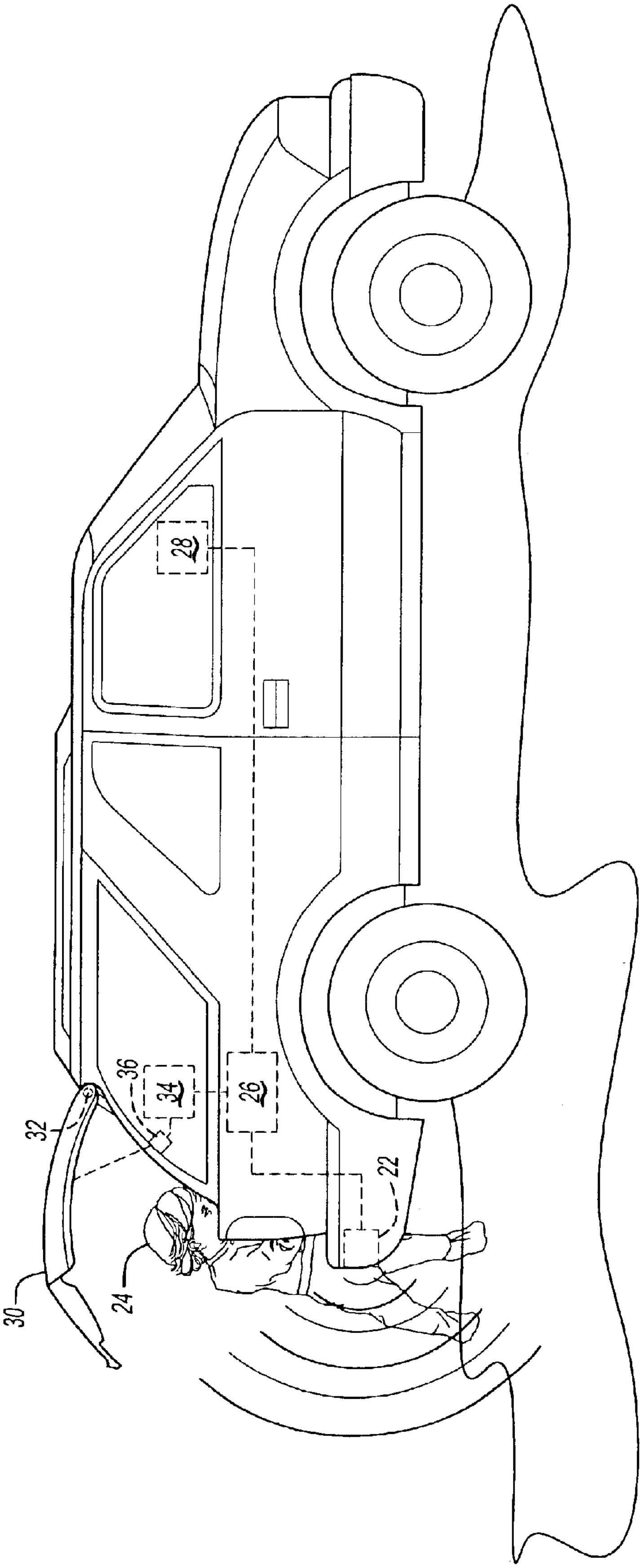
FIG. 2 schematically shows the inventive system.

FIG. 2 schematically shows the present invention. The control 26 communicates not only with the sensors 22, but also with the motor 36. Now, when the liftgate 30 is being closed, the sensors 22 operate. If a child 24 (or other object) is detected in the path of the liftgate 30, then operation of the motor is stopped, or may even be reversed. The present invention thus is able to detect the presence of an object and stop movement of the liftgate without any contact. This is an improvement over the prior art.

Moreover, a separate electrical control module is not required for both the motor and the back-up sensor. Instead, a single control module 26 can perform both functions.

While in the preferred embodiment, this invention is utilized in combination with a power driven liftgate 30, the invention would also extend to manually closed liftgates having some means for preventing manual closing of the liftgate should an object be detected. For purposes of understanding this embodiment, the blocking structure could be a brake, or other structure preventing inward movement of the mechanical drive transmission. A worker of ordinary skill in the art would recognize how to achieve this function.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle incorporating a back-up collision avoidance sensor and a liftgate anti-pinch system comprising:

a liftgate pivotally attached to a vehicle frame and having structure for supporting said liftgate to move between an open and a closed position;

a back-up collision avoidance system including a transmitter sensor adjacent a rear of said frame for detecting the presence of an object in the path of the vehicle when the vehicle is moving in a reverse direction, said back-up collision avoidance system communicating with a display for providing an indication to an operator of the vehicle that an object is in the path of the vehicle; and said back-up sensors also being actuated when said liftgate is being moved to said closed position, and movement of said liftgate to said closed position being blocked when an object has been detected by said back-up collision avoidance system.

2. A vehicle as set forth in claim 1, wherein said structure includes a drive for driving said liftgate to said closed position, and said motor being stopped if an object is detected in the path of said liftgate as it moves toward said closed position.

3. A vehicle as set forth in claim 1, wherein said back-up collision avoidance system utilizes ultrasonic transmitters/sensors.

4. A control system for a vehicle comprising:

a control;

an input to said control from a back-up collision avoidance system to identify the presence of an object rearwardly, of the vehicle; and inputs to said control to provide an indication of when the vehicle is moving in a reverse direction, and when a liftgate is being moved to close, and said control providing output signals to control a movement system for the liftgate when the liftgate is being moved to close to prevent movement of the liftgate to a closed position when the presence of an object has been identified, and to further provide an indication to a vehicle operator of the presence of an object rearwardly of the vehicle, at least when the vehicle is being moved in a reverse direction.

5. A method of operating a vehicle comprising the steps of:

(1) providing a back-up collision avoidance system for detecting an object rearwardly of a vehicle;

(2) sensing for the presence of an object rearwardly of the vehicle, at least when the vehicle is moving in a reverse direction;

(3) providing a liftgate movable between an opened and closed position, and sensing for the presence of an object rearwardly of the vehicle through said back-up collision avoidance system when said liftgate is being moved to a closed position, and blocking further movement of said liftgate when an object is detected during said movement to said closed position.

6. A method as set forth in claim 5, wherein said liftgate is driven to close by a motor, and said motor being stopped should an object be detected.

* * * * *